United States Patent [19]

Kodama et al.

[11] Patent Number: 5,084,775
[45] Date of Patent: Jan. 28, 1992

[54] STILL IMAGE RECORD/PLAYBACK APPARATUS INCLUDING AN ELECTRONIC CAMERA AND A PLAYER CONNECTABLE THERETO

[75] Inventors: Yasumasa Kodama, Kanagawa; Shinji Katsuki; Takashi Fukushima, both of Tokyo; Takashi Hishinuma, Kanagawa, all of Japan

[73] Assignee: Sony Corporation, Tokyo, Japan

[21] Appl. No.: 407,754

[22] Filed: Sep. 22, 1989

[30] Foreign Application Priority Data

Sep. 24, 1988 [JP] Japan .................................. 63-239184

[51] Int. Cl.$^5$ ............................................. H04N 5/781
[52] U.S. Cl. .................................... 358/335; 358/906; 360/35.1
[58] Field of Search ............... 358/906, 342, 341, 343, 358/335; 360/35.1, 33.1

[56] References Cited

U.S. PATENT DOCUMENTS

4,163,256 7/1979 Adcock .................................. 358/906
4,943,867 7/1990 Suetaka et al. ....................... 358/342

Primary Examiner—Roy N. Envall, Jr.
Assistant Examiner—Khoi Truong
Attorney, Agent, or Firm—Alvin Sinderbrand; William S. Frommer

[57] ABSTRACT

Still image record/playback apparatus comprising an electronic camera including an image sensor for sensing an optical image and generating image signals representative thereof, a recorder for recording frames of image signals and selectively operable for playing back recorded image signals and a shutter release switch normally actuable to drive the recorder to record image signals. A player is connectable to the camera and has a signal processor for processing the played back image signals to produce video signals, and a frame feed switch to drive the recorder to play back a frame of image signals. When the camera and player are connected, actuation of the shutter release switch drives the recorder to play back one or more frames of image signals.

10 Claims, 5 Drawing Sheets

STILL IMAGE RECORD/PLAYBACK APPARATUS INCLUDING AN ELECTRONIC CAMERA AND A PLAYER CONNECTABLE THERETO

BACKGROUND OF THE INVENTION

1. Field Of The Invention

This invention relates to electronic image record/playback apparatus and, more particularly, to the selective use of the shutter release switch normally provided on an electronic still camera to record or play back a frame of image signals, depending upon whether the camera is connected to an electronic player.

2. Description Of The Prior Art

So-called electronic still cameras have been introduced in which video signals are generated in response to a sensed image and recorded on a magnetic medium, such as a miniaturized floppy disk. Video picture signals, produced when the recorded video signals are played back, may be displayed on a monitor, such as a conventional television receiver, or may be "printed" to form a "hard copy" image corresponding thereto.

Although separate stand-alone players are known for playing back previously recorded video signals from a floppy disk, it is advantageous to use the operating components of the electronic still camera to reproduce those video signals. Often, the reproduced video signals are not in a format compatible with most conventional monitors or television receivers. For example, the reproduced video signals may not be in the NTSC format. Accordingly, further signal processing of the reproduced video signals often is desired; and an electronic player typically is electrically connected to the electronic camera so as to process the reproduced video signals and, thus, produce picture signals which may be displayed on a monitor or television receiver. The electronic player normally is provided with an output terminal adapted to be connected to the input of such a monitor or television display. When a user actuates a playback button, or frame feed switch, disposed on the electronic player, a playback operation is carried out, whereupon a frame of video signals is reproduced from the magnetic medium at each actuation of the frame feed switch, processed and supplied to the monitor/display.

A typical electronic player is a separate device normally not connected to the electronic camera unless and until a playback operation is desired. However, a playback operation typically is not initiated until the user actuates the frame feed switch, even though the camera, player and monitor may be properly connected. In some systems, the frame feed switch is concealed to avoid inadvertent operation of the player. In other systems, the frame feed switch may be included in an array of operating controls, and the user may erroneously actuate the wrong control. It is desirable to simplify a playback operation.

A typical electronic camera is provided with a shutter release button, or switch, normally actuated to effect the recording of image signals. But, when the camera is connected to the player, it generally is preferred not to initiate a recording operation in the event that the shutter release switch is actuated. However, as described in copending application Ser. No. 407,147 it is desirable for the camera to be disposed in a playback mode when it is connected to a player. Inadvertent operation of the shutter release switch may result in improper operation of the apparatus.

OBJECTS AND SUMMARY OF THE INVENTION

Therefore, it is an object of the present invention to provide improved apparatus which avoids the foregoing drawbacks and disadvantages.

Another object of this invention is to provide image record/playback apparatus which is disposed in a playback mode when a player is coupled to an electronic still camera and which carries out a playback operation if the shutter release switch of the camera is actuated.

A further object of this invention is to provide image record/playback apparatus in which a playback operation is carried out if either the playback switch of a player or the shutter release switch of a camera connected thereto is actuated.

An additional object of this invention is to provide still image record/playback apparatus in which the shutter release switch of an electronic camera normally is used to record image signals but, when the camera is connected to a player, that same switch is used to play back one frame or successive frames of image signals.

Various other objects, advantages and features of the present invention will become readily apparent from the ensuing detailed description and the novel features will be particularly pointed out in the appended claims.

In accordance with this invention, still image record/playback apparatus is comprised of an electronic camera including an image sensor for sensing an optical image and generating image signals representative thereof, a recorder for recording frames of image signals and selectively operable for playing back recorded image signals and a shutter release switch normally actuable to drive the recorder to record image signals. An electronic player is connectable to the camera and includes a signal processor for processing the played back image signals to produce video signals and a frame feed switch actuable to drive the recorder to play back a frame of image signals. When the camera and player are connected, actuation of the shutter release switch drives the recorder to play back a frame of image signals.

In accordance with one aspect of this invention, when the camera and player are connected, each actuation of the shutter release switch results in the playing back of one frame of image signals so that successive actuations of the shutter release switch causes successive frames of image signals to be played back. As a feature of this aspect, the shutter release switch exhibits at least two operating states: one to play back a single frame of image signals and another to play back successive frames of image signals.

In accordance with another aspect of this invention, when the camera and player are not connected, each actuation of the shutter release switch results in the recording of one frame of image signals.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF A PREFERRED EMBODIMENT

Figure 1:
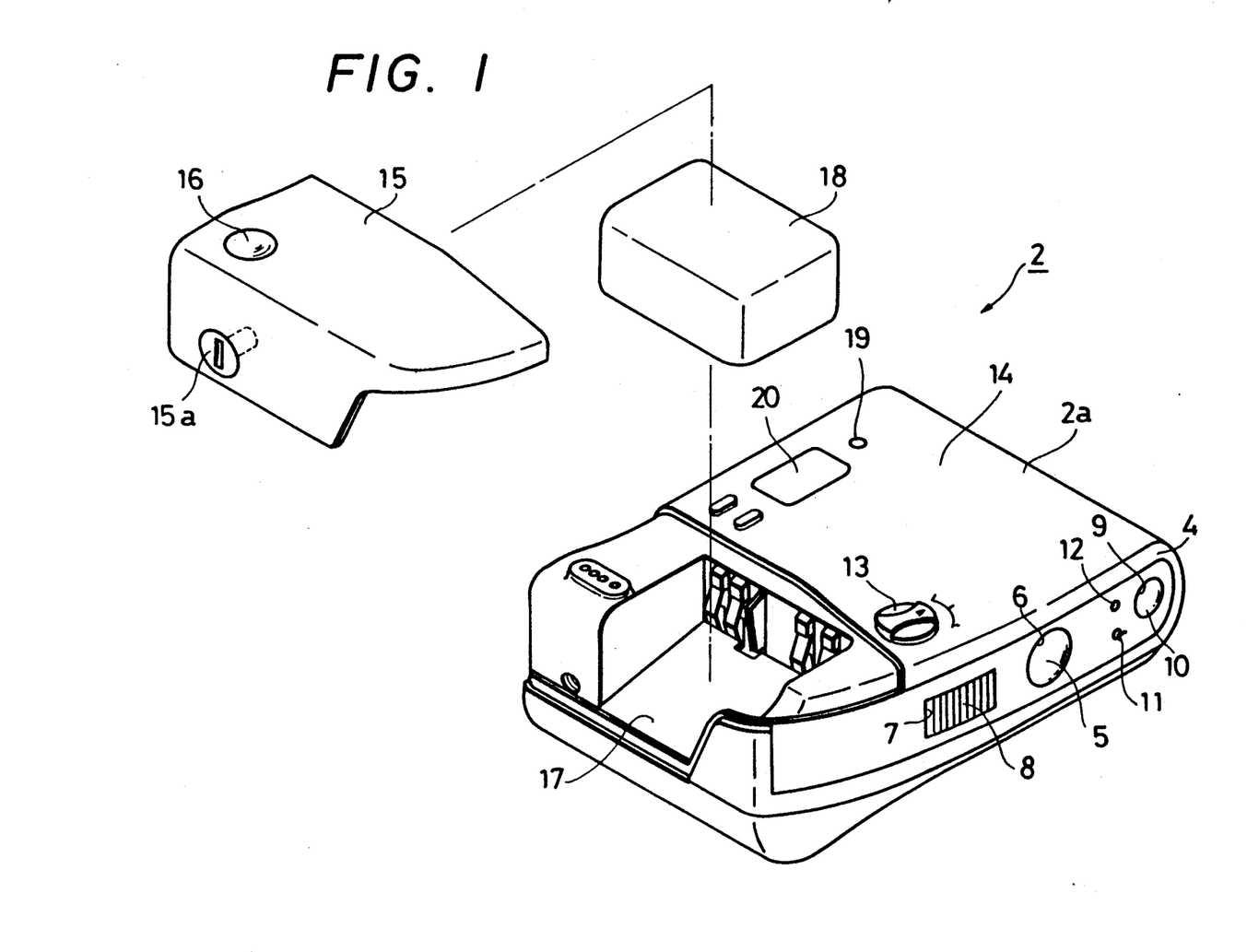
FIGS. 1 and 2 are front and rear perspective views of a preferred electronic still camera.

Referring now to the drawings, wherein like reference numerals are used throughout, FIG. 1 is a front perspective view of one embodiment of an electronic still camera 2 adapted to record image signals on a magnetic medium. Camera 2 is provided with an outer casing 2a whose front portion 4 includes an aperture 6 through which a photographic lens 5 may be exposed to an external image or scene to be photographed. Another aperture 7 adjacent to aperture 6 in front portion 4 permits an electronic flash unit 8 to irradiate the image to be photographed. Yet another aperture 9 exposes an objective lens 10 to the image being photographed, this objective lens being used by the user as a view finder.

A photosensor 11 is provided on front portion 4 of housing 2a to sense the quantity of light emitted by electronic flash 8. When a proper amount of light is sensed, the flash unit is turned off. In addition, a light emitting diode (LED) 12 is disposed on front portion 4 and is used as a timer indicator. As is found in conventional photography, LED 12 blinks during a timing operation to apprise a user of the time duration remaining until an image is photographed. Those of ordinary skill in the art will recognize that LED 12 is part of a self-timer.

A mode switch 13 is located on upper portion 14 of casing 2a and, in one embodiment, is comprised of a rotary switch having three contacts, or detents. Switch 13 permits any one of three modes to be selected by the user, such as a power off mode, a single frame photographing mode and a continuous, or successive frame photographing mode. In the power off mode, electrical power is not supplied to the operating components of camera 2, thereby placing the camera in an OFF state. In the single photographing mode, only one image or frame, is photographed in response to each depression of a shutter release button 16. In the continuous photographing mode, successive images are recorded while the shutter release button is depressed. These functions are analogous to those performed in conventional photographic cameras.

Camera 2 also includes a cover 15 detachably mounted on casing 2a by means of a fastening screw 15a. Shutter release button 16 is disposed on cover 15 and actuates a shutter release switching unit having first and second operating states which are energized sequentially when the shutter release button is depressed. For example, the switching unit may include first and second switches such that when the shutter release button is partially depressed, the first switch is operated to supply electrical power to an image sensor and to recording elements, to be described; and when button 16 is depressed further, the second switch is operated to carry out an image recording operation. Thus, during a photographing, or recording, operation of camera 2, the first switch establishes a stand-by condition immediately before the actual image recording operation is performed. As described in greater detail in copending application 407,147, this stand-by condition conserves power, which is particularly helpful when the power source is a battery.

Shutter release button 16 and the shutter release switching unit actuated thereby also are adapted to control a playback operation when camera 2 is connected to an electronic player (described below). As will be explained, camera 2 is disposed in a playback mode when a player is connected thereto, whereupon the first operating state of the shutter release switching unit (as may be exhibited when the aforementioned first switch is operated) results in the playing back of a frame of previously recorded image signals, and the second operating state of the shutter release switching unit (as may be exhibited when the aforementioned second switch is operated) results in the playing back of successive frames of image signals for as long as this operating state is maintained. Hence, during a playback mode, the shutter release switching unit may be thought of as a frame feed switching unit.

The body of camera 2 is provided with a recess 17 which is covered by cover 15. The recess is adapted to receive a rechargeable battery pack 18 or, alternatively, one or more primary batteries for supplying electrical power to the operating components included within camera 2.

Top portion 14 of casing 2a also is provided with a self-timer button 19 which cooperates with shutter release button 16 to carry out a time delayed imaging operation during normal, or recording, operations of camera 2. For example, if self-timer button 19 is depressed and then shutter release button 16 also is depressed, a timed picture taking operation is initiated. LED 12 blinks during a pre-established time-out period at the completion of which an image is recorded.

Top portion 14 of casing 2a also is provided with a display 20 for displaying various data to the user of camera 2. This display may be similar to many LCD displays commonly found in conventional photographic cameras recently introduced.

Figure 2:
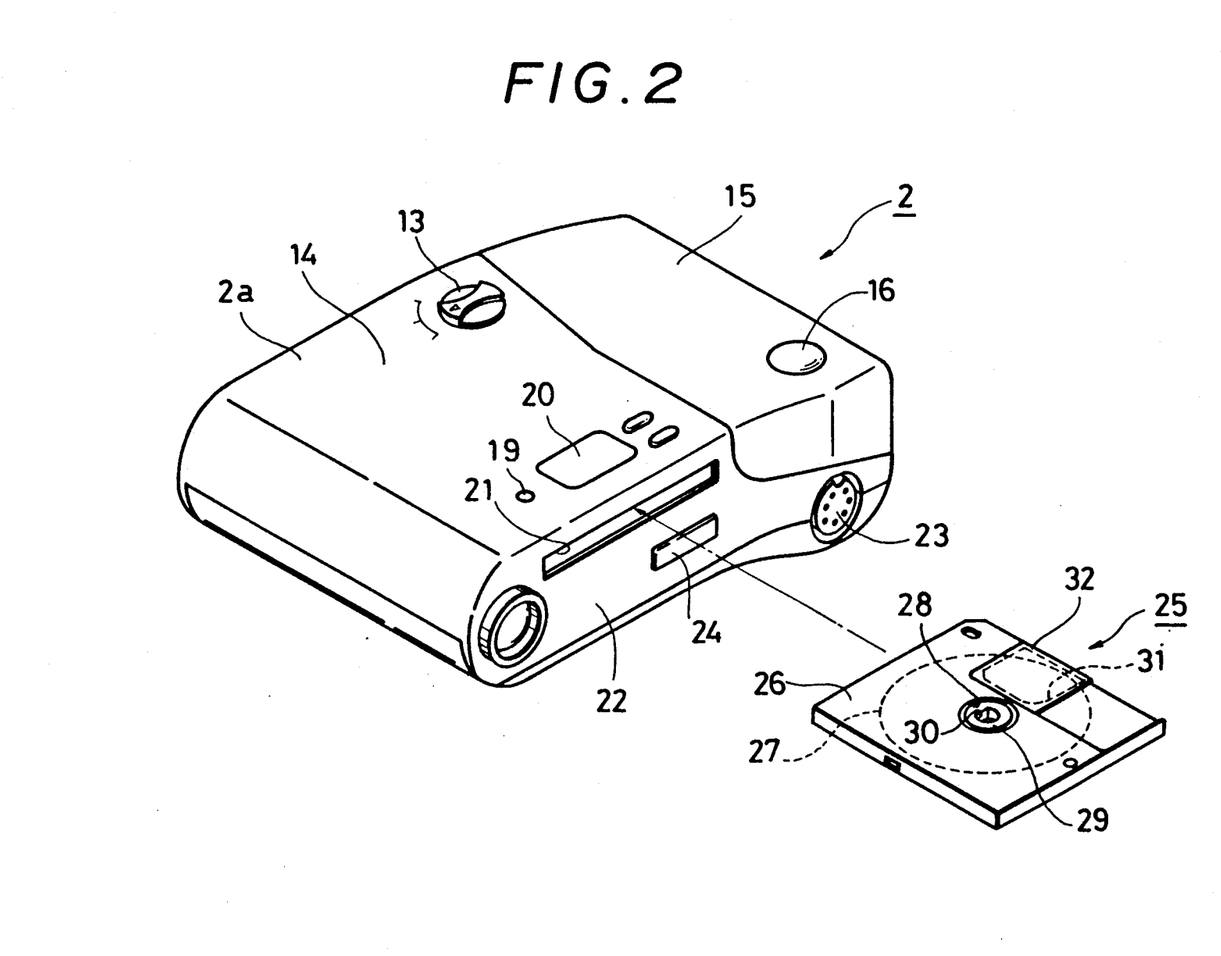

Turning to FIG. 2, a rear portion 22 of casing 2a is provided with an insertion port 21, formed as a slit and adapted to receive a magnetic recording medium upon which image signals are recorded. Preferably, the magnetic recording medium is embodied as a magnetic disk housed within a suitable jacket, and referred to as a magnetic disk cassette 25. Jacket, or case 26 of cassette 25 is formed of a synthetic resin and, as illustrated, exhibits a square, box-like shape. A magnetic disk 27 is rotatably supported within case 26 by means of a center core 29 fixed in the center of disk 27 which is aligned with aperture 28 of case 26. Center core 29 may be accessed by a spindle (not shown) within camera 2 which passes through aperture 28. An engaging hole 30 is provided in center core 29 and cooperates with the rotatable drive mechanism and spindle of the camera to rotate disk 27.

Case 26 includes a pair of apertures, only one of which 31 is illustrated, through which record/playback heads are inserted into magnetic contact with disk 27. Aperture 31 is formed in the vicinity of a side edge of case 26 and is covered by a slidable shutter 32 provided on the case. Shutter 32 opens to permit a record/playback head to pass through aperture 31 into magnetic contact with disk 27 and, after the head is withdrawn, the shutter closes to protect the magnetic medium. Camera 2 includes elements which cooperate with shutter 32 to slide it to its open and closed positions.

It is appreciated that when cassette 25 is manually inserted through insertion port 21, shutter 32 slides to its open position and the disk drive spindle included in camera 2 engages hole 30 to rotate disk 27. When shutter 32 is in its open position, the aforementioned record/playback head contacts disk 27.

An eject button 24 is provided on rear portion 22 of casing 2a and is adapted, when operated, to eject cassette 25 from camera 2 through port 21.

A connector 23, such as a multi-pin socket, also is provided on rear portion 22 of the casing. Connector 23 is adapted to receive a connector cable for electrically connecting camera 2 to an electronic player 3 shown in FIG. 3.

Figure 3:
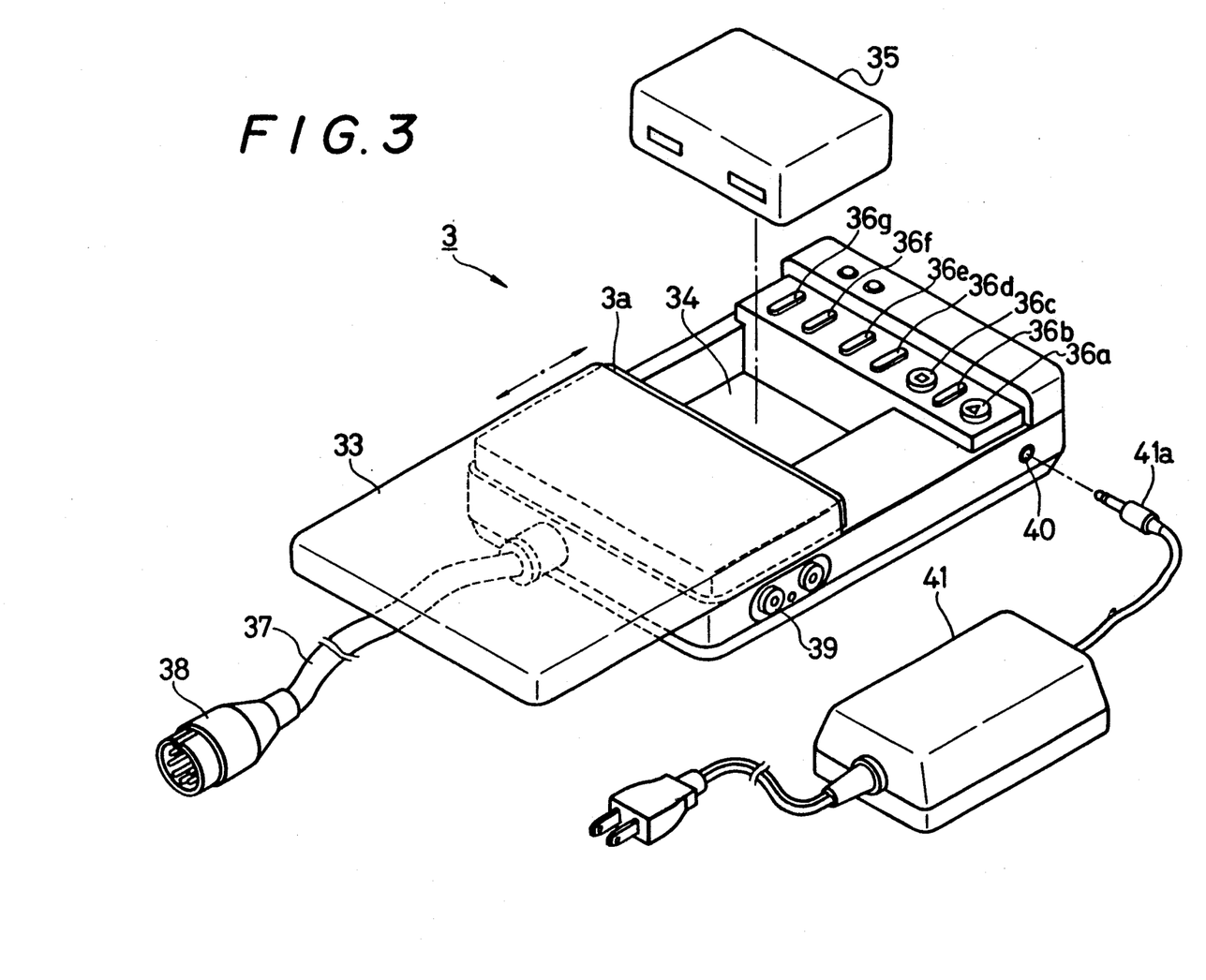
FIG. 3 is a perspective view of an electronic player which may be used with the camera of FIGS. 1 and 2.

As illustrated, player 3 is of a generally rectangular shape having an outer casing 3a which houses signal processing circuitry, to be described. Casing 3a includes a recess 34 adapted to receive a rechargeable battery pack 35 or, alternatively, one or more primary batteries for supplying electrical power to the signal processing circuitry. A slide cover 33 slidably engages a groove formed on outer casing 3a and is adapted to cover recess 34 and battery 35.

A ledge is provided adjacent recess 34 on which are disposed various selector buttons 36, such as a single frame feed playback button 36a, a successive frame feed playback button 36b which operates to play back successive frames of image signals, each frame being played back and displayed for a predetermined period of time (e. g. 5 seconds), a stop button 36c, a reverse (or rewind) button 36d, a fast (forward) feed button 36e, a single frame erase (or clear) button 36f, and a disk erase (or all clear) button 36g. As shown, buttons 36 are concealed when cover 33 slides to its closed position.

Outer casing 3a also is provided with a pair of LED's which are used to indicate whether rechargeable battery 18 included in camera 2 or rechargeable battery 35 included in player 3 is in the process of being recharged. As will be described below in conjunction with FIG. 4, player 3 includes a charging unit which, when supplied with external energy, is used to charge either the battery included in the player or, when the player is connected to the camera, the battery included in the camera.

A connecting cable 37 extends from outer casing 3a and terminates in a plug 38 adapted to be inserted into socket 23 of camera 2. Electrical connections between the camera and player are used to effect an image playback operation and various other purposes, described below.

Player 3 also includes an output terminal 39 disposed on a side wall of outer casing 3a for supplying to an external monitor or television display picture signals which are produced in response to image signals played back from cassette 25 in camera 2. For example, the signal processing circuitry in player 3 may supply NTSC signals to the monitor coupled to terminal 39 so that a still image may be reproduced and displayed thereon.

Player 3 further includes a DC input terminal 40 adapted to receive a plug 41a of an AC adaptor 41. When the adaptor is connected to AC mains, it produces and supplies DC power to player 3 by means of plug 41a and DC input terminal 40.

Figure 4:
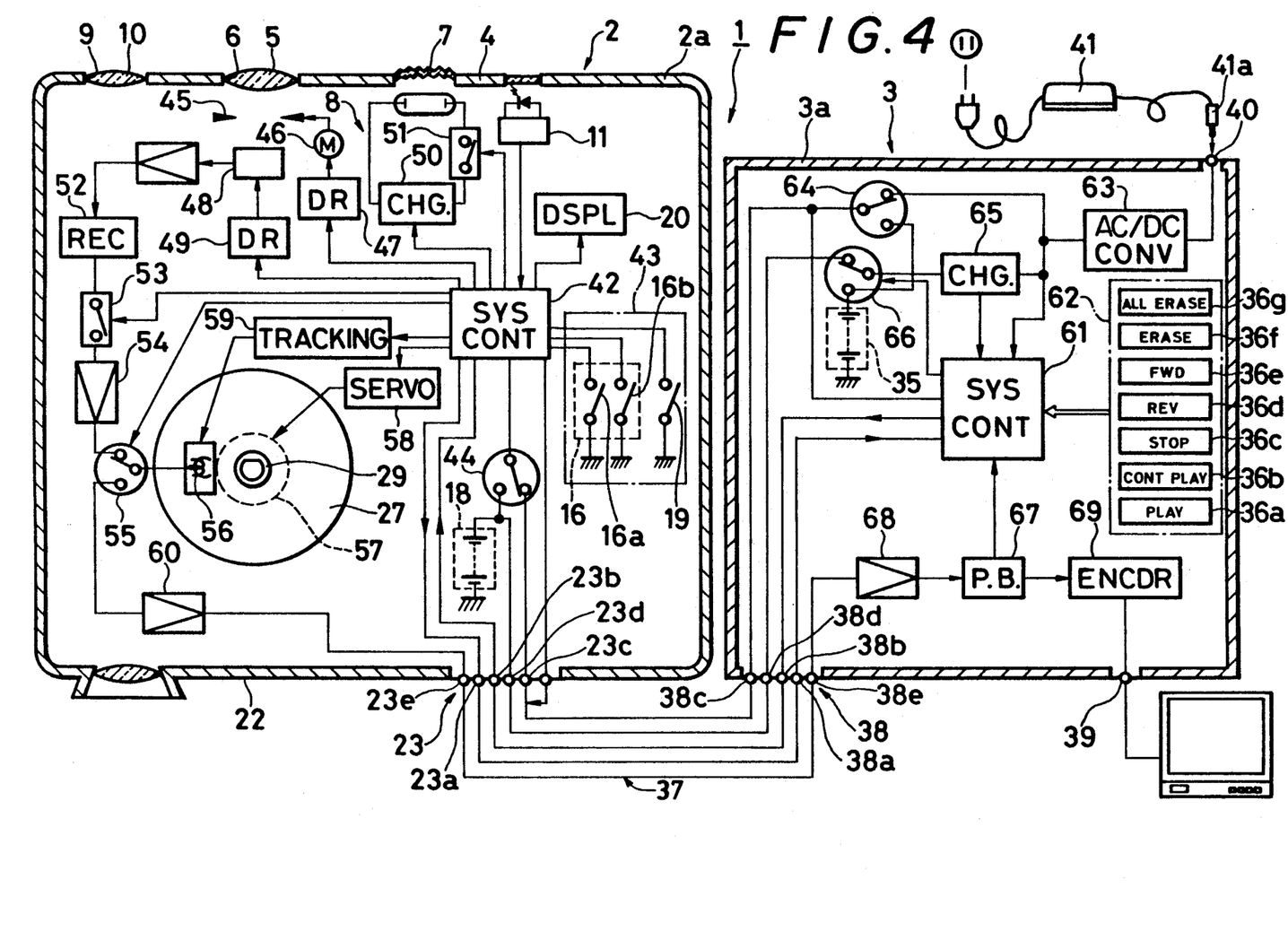
FIG. 4 is a block diagram of electronic circuitry included in an interconnected camera and player.

Turning now to FIG. 4, there is illustrated a block diagram of camera 2 connected to player 3 by means of the connection established by cable 37, plug 38 and socket 23. FIG. 4 schematically illustrates the electrical connections between plug 38 and socket 23. It is appreciated that cable 37 is comprised of individual conductors; and each pin connection of socket 23 is coupled to a respective connection of plug 38 to interconnect circuit elements of camera 2 with circuit elements of player 3.

Camera 2 is comprised of those elements shown and described above in conjunction with FIGS. 1 and 2 and, additionally, includes operating components, such as an image sensor 48, recording circuitry 52, a playback amplifier 60, various control circuits and a system controller 42. Sensor 48 is adapted to receive an optical image projected thereto through lens 5 and iris 45. The iris is driven by a motor 46 which, in turn, is controlled by a motor drive circuit 47. Sensor 48 preferably is formed as a solid state sensing device, such as an MOS sensor, and is coupled to a drive circuit 49 which operates as an electronic shutter for the sensor.

Sensor 48 is responsive to an image projected thereto to produce corresponding image signals that are supplied by an amplifier to recording circuitry 52. Recording circuitry 52 processes the image signals supplied thereto; and these processed image signals are coupled to a recording amplifier 54 by a switch or gate 53, and then supplied to a read/write head 56 by a record/playback switch 55. The read/write head corresponds to the aforementioned record/playback head. For convenience and simplification, gate 53 and switch 55 are illustrated schematically as simple electromechanical switches. As will be described, both gate 53 and switch 55 are controlled by system controller 42.

During a recording operation, read/write head 56 functions to record the processed image signals on magnetic disk 27 which is rotatably driven by a spindle motor 57. Disk 27 preferably rotates at a substantially constant speed, and motor 57 is controlled by a servo circuit 58. Additionally, head 56 is driven in a generally radial direction across disk 27 by a suitable motor, such as a stepping motor, controlled by a tracking servo circuit 59. Thus, as disk 27 rotates, head 56 records successive tracks thereon.

The playback circuitry provided in camera 2 includes a playback amplifier 60 which is coupled to read/write head 56 by aforementioned switch 55. During a playback operation, previously recorded image signals are played back by head 56, amplified by amplifier 60 and supplied by the amplifier to an output terminal 23e of connector socket 23.

The camera also includes an electronic flash charger 50 which is coupled to a suitable flash tube (or equivalent) by way of a flash synchro contact 51. Flash charger 50 is adapted to be controlled by system controller 42 which also functions to control driving circuits 47 and 49 as well as display 20. Flash photosensor 11 supplies to the system controller information representing the amount of flash illumination that has been generated by the flash unit; and this information is used by system controller 42 to open flash synchro contact 51 to terminate the flash discharge.

As illustrated, system controller 42 also is coupled to an operation unit 43 which, generally, includes the aforedescribed shutter release button 16 and self-timer button 19. Operation unit 43 supplies the system controller with an indication of each button that is operated.

As illustrated, shutter release button may be comprised of two operating switches 16a and 16b which are actuated as button 16 is depressed. For example, switch 16a is operated, or closed, when the shutter release button is partially depressed, thereby establishing a first operating state to be sensed by system controller 42. Switch 16b is operated, or closed, when the shutter release button is fully depressed, thereby establishing a second operating state to be sensed by the system controller. During a record mode, as when camera 2 is not connected to player 3, the first state of shutter release button 16 disposes the camera in a standby or ready condition for recording a frame of image signals, and the second state initiates the recording operation. This is described more particularly in copending application Ser. No. 407,147. During a playback mode, as when camera 2 is connected to player 3, the first state of the shutter release button preferably initiates the playback of a single frame of image signals, and the second state initiates the playback of successive frames, albeit one frame at a time, until the button is released.

Battery 18 is schematically illustrated as being coupled to system controller 42 by way of a power selector switch 44. Preferably, the operation of switch 44 is controlled by system controller 42; but it is contemplated that this switch may alternatively be operated when plug 38 is inserted into socket 23. When player 3 is not connected to camera 2, switch 44 couples battery 18 to the system controller and also to various ones of the circuits included in the illustrated operating components of the camera so as to supply electric power thereto. However, when player 3 is connected to camera 2, switch 44 couples electric power supplied from the player to system controller 42 and to the operating components of the camera. It will be appreciated that the energy level of battery 18 thus is not depleted when the player and camera are connected.

System controller 42 is coupled to a predetermined terminal included in socket 23 to detect when plug 38 is connected thereto. Thus, the system controller detects a connection between camera 2 and player 3. As schematically illustrated, some of the conductors of cable 37 are coupled between system controller 42 and a similar system controller 61 included in player 3. For example, terminals 23a and 23b are connected by respective conductors to terminals 38a and 38b to permit communication between the respective system controllers for a purpose described below.

Although not shown, an auxiliary source of power may be coupled to system controller 42 to prevent any loss of information due to power drop out when switch 44 is changed over from, for example, battery 18 to the external power source provided by player 3. Such auxiliary power supply may be a lithium battery or other conventional back-up power source.

Player 3 is comprised of signal processing circuitry adapted to be coupled by way of cable 37, plug 38 and socket 23 to playback amplifier 60 of camera 2. The player also includes a battery 35, as described previously, as well as an AC/DC converter 63 and a battery charger 65. As shown, system controller 61 of player 3 is coupled to an encoding circuit 62, or the like, adapted to supply the system controller with signals representing the particular one of push-buttons 36a-36g that is operated.

AC/DC converter 63 included in player 3 is connected by DC input terminal 40 to plug 41a and then to AC adaptor 41, as described previously in connection with FIG. 3. The DC output of converter 63 is coupled to system controller 61 and also to battery charger 65 and to a selector switch 64. The output of selector switch 64 is coupled to terminal 38c and, by way of the illustrated conductor, to terminal 23c of camera 2, this latter terminal being coupled to system controller 42 by way of switch 44.

Selector switch 64 includes an additional input coupled to battery 35. Thus, depending upon the state, or position, of switch 64, either battery 35 or converter 63 is utilized to supply power to camera 2. In one embodiment, system controller 61 determines the state, or switching position, of selector switch 64. In an alternative embodiment, the state or position of switch 64 is determined by the presence or absence of a connection between DC input terminal 40 and plug 41a. That is, when plug 41a is inserted into terminal 40, switch 64 couples the output of converter 63 to terminal 23c of camera 2. If plug 41a is not connected to DC input terminal 40, switch 64 couples battery 35 to the camera.

In one embodiment, the output of converter 63 is coupled to system controller 6, as by way of a voltage detector (not shown). It is appreciated that the converter produces an output DC voltage only when it is connected to adaptor 41. Thus, system controller 61 may determine the state, or position, of switch 64 as a function of the voltage detected at the output of converter 63.

Battery charger 65 is coupled to the output of converter 63 and is adapted to produce a charging voltage when the converter is supplied with operating voltage from adaptor 41. The output of battery charger 65 is selectively coupled by way of a charging switch 66 to battery 35 or to battery 18. In one embodiment, the state, or position, of charging switch 66 is determined by system controller 61 as a function of whether camera 2 is connected to player 3. In the preferred embodiment, when system controller 42 of camera 2 detects the connection between the camera and player, a suitable indication thereof is supplied to system controller 61 which then senses if converter 63 produces an output DC voltage. If so, system controller 61 commands charging switch 66 to connect battery charger 65 to terminal 38d which, in turn, is connected to battery 18 by way of terminal 23d. If battery 18 is fully charged, system controller 42 supplies a suitable indication thereof to system controller 61, whereupon system controller 61 changes over the state, or position, of charging switch 66 so as to connect the output of battery charger 65 to battery 35. System controllers 42 and 61 thus operate to preferentially charge camera battery 18 and, thereafter, to charge player battery 35 when the camera and player are interconnected and, moreover, when converter 63 is supplied with a voltage from adapter 41.

The signal processing circuitry included in player 3 includes a playback amplifier 68, a playback circuit 67 and a signal encoder 69. Playback amplifier 68 is coupled to a terminal 38e which, in turn, is coupled to terminal 23e of camera 2 to supply the played back image signals to the player. The amplified image signals are demodulated by playback circuit 67 and supplied to signal encoder 69. In addition, the synchronizing signals included in the played back image signals are supplied to system controller 61 to synchronize its operation. Encoder 69 produces a viewable picture signal, such as an NTSC color television signal, from the amplified, played back image signals. Encoder 69 is coupled to output terminal 39 to which a monitor may be connected so as to display the still picture reproduced from disk 27.

Although not shown, it will be appreciated that suitable operating power is supplied to the processing circuitry included in player 3 either from battery 35 or from converter 63, as determined by system controller 61.

In the preferred embodiment, system controller 42 includes a microprocessor, such as an Intel Model 8088. Preferably, system controller 61 also includes a microprocessor and cable 37 provides communication paths there between from terminals 23a and 23b to terminals 38a and 38b, respectively.

The manner in which shutter release button 16 operates to control recording and playback operations now will be described in conjunction with the flow chart shown in FIG. 5. It will be assumed that this flow chart represents the programmed operations of system controller 42. Initially, the microprocessor of system controller 42 inquires, at inquiry 90, if player 3 is connected to camera 2. As mentioned above, system controller 42 is coupled to a predetermined terminal included in socket 23 to detect when plug 38 is connected thereto. If this connection is not detected, inquiry 90 is answered in the negative and the microprocessor advances to inquiry 91 to determine if switch 16a is closed. In the example described herein, switch 16a is closed when shutter release button 16 is partially depressed. In general, other suitable switch activating devices may be used rather than a pushbutton switch to close switches 16a and 16b. Regardless of the particular means used to actuate the switches, if inquiry 91 is answered in the negative, the microprocessor merely cycles through the loop formed of inquiries 90 and 91.

If inquiry 91 is answered in the affirmative, that is, if switch 16a is closed, the microprocessor establishes a camera standby record mode, as represented by instruction 92. In this standby mode, the system controller energizes spindle motor 57 to initiate the spinning of disk 27. In addition, energy is supplied to recording circuit 52 and to the other circuits included in the operating components of camera 2 to facilitate an electronic image recording operation. Camera 2 thus is in its "ready" mode awaiting the generation of image signals by sensor 48.

After camera 2 is disposed in its standby record mode, the microprocessor inquires, at 93, if switch 16b is closed. In the example described herein, switch 16b is operated when shutter release button 16 is fully depressed. If this switch 16b is not closed, inquiry 93 is answered in the negative and the microprocessor then cycles through the loop formed of inquiry 91, instruction 92 and inquiry 93; and the camera remains in its standby mode. If, while in this standby mode, switch 16a is opened, inquiry 91 is answered in the negative and the microprocessor returns to its start condition.

If, while cycling through the illustrated loop, switch 16b is closed, inquiry 93 is answered in the affirmative and the microprocessor advances to instruction 94 to record one frame of image signals. In particular, a frame of image signals is read from image sensor 48 and supplied, by way of recording circuit 52, gate 53 and amplifier 54 to read/write head 56. As described in copending application Ser. No. 407,742, this image signal recording operation is carried out if disk 27 is rotating at a speed suitable for recording. Head 56 records a frame of image signals in a respective track (or, as an alternative, in a predetermined number of tracks) on the disk.

After recording a frame of image signals, the microprocessor returns to its start condition. Thus, it is seen that each time shutter release button 16 is fully depressed, camera 2 first is placed in its standby record mode and then the frame of image signals is recorded. Successive actuations of the shutter release button result in the recording of successive frames of image signals.

Figure 5:
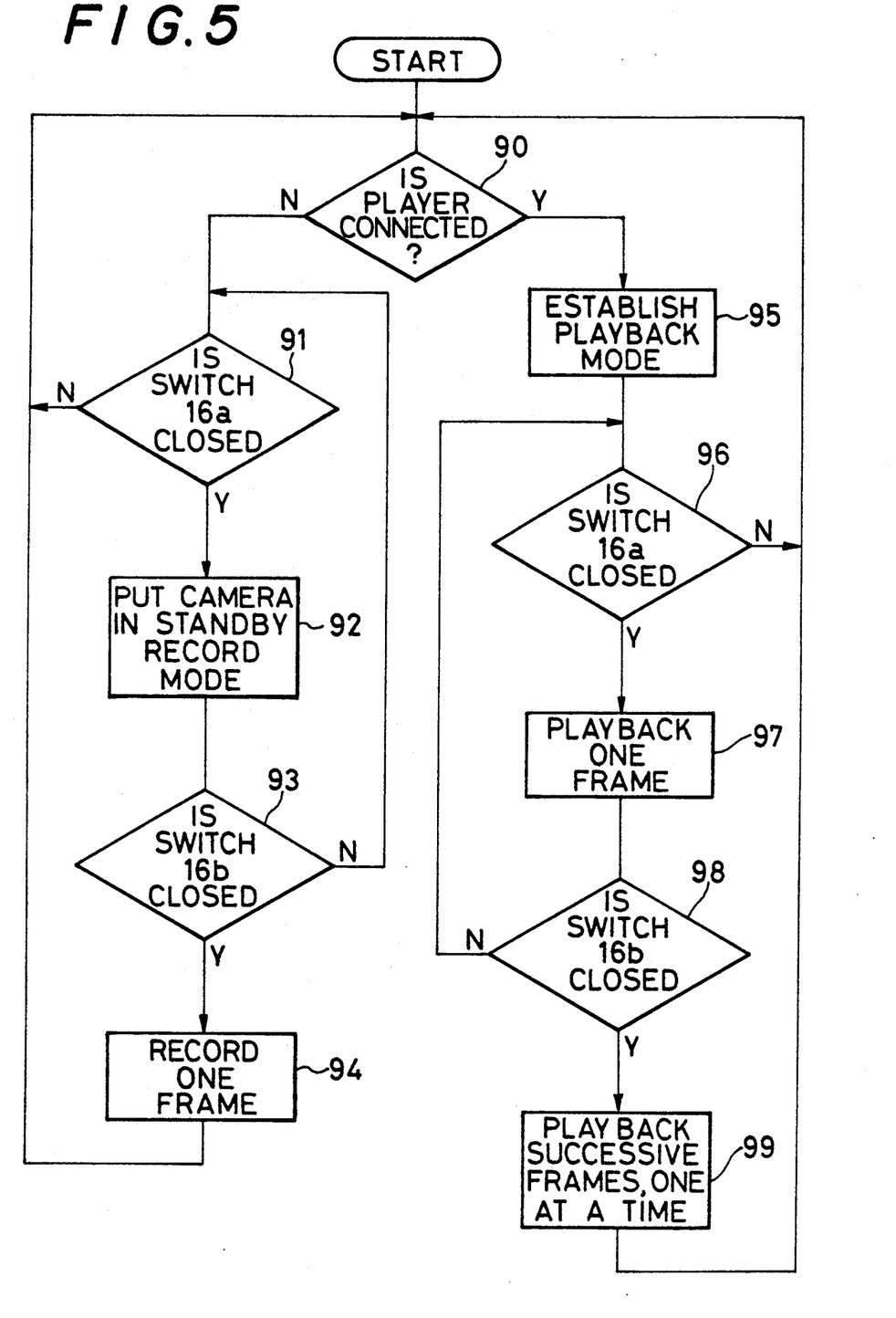
FIG. 5 is a flow chart representation of the manner in which operation of the camera and player are controlled by the camera shutter release switch.

The foregoing operation of the flow chart shown in FIG. 5 has assumed that camera 2 is not connected to player 3. If, however, the camera and player are connected, system controller 42 detects this connection and inquiry 90 is answered in the affirmative. The microprocessor then advances to instruction 95 to establish the playback mode for camera 2 and player 3. In this playback mode switch 55 is changed over to couple read/write head 56 to playback amplifier 60 and, moreover, a signal is supplied to system controller 61 in player 3 from system controller 42, indicative of this connection. As a consequence, system controller 61 energizes playback circuit 67 to condition the player to process image signals played back by head 56 and supplied to the playback circuit by way of terminals 23e and 38e.

After establishing this playback mode, the microprocessor advances to inquiry 96 to determine if switch 16a is closed. If not, the microprocessor merely cycles through the loop formed of inquiry 90, instruction 95 and inquiry 96. Once switch 16a is closed, inquiry 96 is answered in the affirmative and the microprocessor advances to instruction 97 to play back one frame of image signals from disk 27. Servo circuit 58 and tracking servo circuit 59 are controlled by system controller 42 such that head 56 reproduces one frame of image signals. This reproduced frame of image signals is amplified by playback amplifier 60, further amplified by amplifier 68, processed by playback circuit 67, encoded by encoder 69 and displayed by the monitor which may be connected to the encoder.

The microprocessor then advances from instruction 97 to inquire, at 98, if switch 16b is closed. If this inquiry is answered in the negative, the microprocessor cycles through the loop formed of inquiry 96, instruction 97 and inquiry 98. Thus, in the preferred embodiment, only one frame of image signals is played back when shutter release button 16 is partially depressed. If the shutter release button thereafter is released, inquiry 96, which is reached through the aforementioned loop, is answered in the negative and the microprocessor resumes its start condition.

Let it be assumed that inquiry 98 is answered in the affirmative. This closure of switch 16b is sensed by system controller 42 and the microprocessor therein advances to instruction 99 to play back successive frames of image signals, one frame at a time. Thus, servo circuit 58 and tracking servo circuit 59 are controlled by the system controller to play back one frame of image signals and then, a predetermined time following the reproduction of this one frame, the next following frame of image signals is played back, and then another, and so on. In one embodiment, each frame of image signals is reproduced for a duration of five seconds. It is appreciated that other reproduction time periods may be used, if desired. Thus, with this example, a new image is displayed on the monitor every five seconds. This is effected by advancing head 56 from one track (or set of tracks) to another by tracking servo circuit 59. Accordingly, successive image frames are reproduced and displayed, one frame at a time. The microprocessor then returns to its start condition.

Thus, successive frames of image signals may be reproduced and displayed by successive closures of switch 16a, as by partially depressing the shutter release button, releasing that button and then partially depressing it once again. Alternatively, successive frames of image signals may be reproduced and displayed simply by closing switch 16b, that is, by fully depressing the shutter release button. This reproduction of successive frames of image signals continues until the shutter release button is released.

Of course, a single frame of image signals may be reproduced by operating frame feed playback button 36a; and successive frames of image signals may be reproduced, one frame at a time, by operating successive frame feed playback button 36b. System controller 61 included in player 3 responds to these playback buttons to supply a play signal (or other suitable playback control signals) to system controller 42 that serve to emulate the operation of switches 16a and 16b, described above.

Hence, while shutter release switch 16 normally is used to record image signals on disk 27, when camera 2 is connected to player 3 this very same shutter release button is used to play back one or successive frames which had been previously recorded on the disk.

While the present invention has been particularly shown and described with reference to a preferred embodiment, various changes and modifications may be made without departing from the scope and spirit of the invention. For example, shutter release button 16 may be replaced by a slide switch or other switch-actuating device that exhibits a quiescent state (corresponding to the opening of both switches 16a and 16b), a first operating state (corresponding to the closure of switch 16a) and a second operating state (corresponding to the closure of switch 16b). This facilitates a playback operation which, heretofore, was effected only by operating the playback buttons included in player 3. Consequently, camera 2 may be spaced from player 3 by a significant distance without impairing or complicating the initiation of a playback operation. That is, the user now may operate a switch mechanism on the camera in place of a switch mechanism on the player.

It is intended that the appended claims be interpreted as including the embodiment described herein, the aforementioned alternatives and all equivalents thereto.

What is claimed is:

1. Still image record/playback apparatus comprising: an electronic camera including image means for generating image signals in response to an optical image, record/playback means for recording frames of image signals on a record medium and selectively operable to play back recorded image signals, and shutter release switch means normally actuable to cause said record/playback means to record image signals; and a player connectable to said camera and including signal processing means for processing played back image signals to produce video signals, and frame feed switch means actuable to cause said record/playback means to play back a frame of image signals; and apparatus further including additional means for causing said record/playback means to play back a frame of image signals in response to the actuation of said shutter release switch means when said camera and player are connected.

2. The apparatus of claim 1 wherein said additional means for causing said record/playback means to playback a frame of image signals responds to each actuation of said shutter release switch means to cause said record/playback means to play back a frame of image signals when said camera and player are connected, whereby successive actuations of said shutter release switch means causes successive frames of image signals to be played back.

3. The apparatus of claim 2 wherein said shutter release switch means exhibits a quiescent state and first and second operating states; and wherein said additional means for causing said record/playback means to playback a frame of image signals is responsive to each actuation of said shutter release switch means to its first operating state to cause said record/playback means to play back a single frame of image signals, and said additional means is responsive to the actuation of said shutter release means to its second operating state to cause said record/playback means to play back successive frames of image signals.

4. The apparatus of claim 1 wherein said additional means for causing said record/playback means to playback a frame of image signals comprises camera control means included in said camera and further operable when said camera and player are connected to enable said record/playback means to play back image signals and additionally operable when said camera and player are not connected to enable said record/playback means to record image signals.

5. The apparatus of claim 4 wherein said camera control means comprises a microprocessor.

6. Still image record/playback apparatus comprising: an electronic camera including image means for generating image signals in response to an optical image, record/playback means for recording frames of image signals on a record medium and selectively operable to play back recorded image signals, and shutter switch means actuable to first and second operating states for selecting the operation of said record/playback means; a player connectable to said camera and including signal processing means for processing played back image signals to produce video signals, and frame feed switch means actuable to cause said record/playback means to play back a frame of image signals; and control means operable when said camera and player are not connected for conditioning said record/playback means to record image signals when said shutter switch means is actuated to said first operating state and for causing said record/playback means to record image signals when said shutter switch means is actuated to said second operating state, said control means being operable when said camera and player are connected for causing said record/playback means to play back a frame of image signals when said shutter switch means is actuated to said first operating state and for causing said record/playback means to play back successive frames of image signals when said shutter switch means is actuated to said second operating state.

7. The apparatus of claim 6 wherein said control means comprises a camera controller included in said camera.

8. The apparatus of claim 7 wherein said camera controller includes means for detecting when said camera and player are connected to establish a playback mode of operation for said record/playback means and means for responding to the actuation of said shutter switch means to cause said record/playback means to play back image signals.

9. The apparatus of claim 8 wherein said control means further comprises a player controller included in said player and responsive to the actuation of said frame feed switch means to supply a play signal to said camera controller for causing said record/playback means to play back a frame of image signals.

10. The apparatus of claim 8 wherein said camera controller further includes means for responding to the actuation of said shutter switch means to said first operating state for conditioning said recording playback means to record image signals and for responding to the actuation of said shutter switch means to said second operating state for causing said record/playback means to record image signals when said camera and player are not detected as being connected to each other.

* * * * *